United States Patent [19]

Nease et al.

[11] Patent Number: 4,942,591
[45] Date of Patent: Jul. 17, 1990

[54] MULTIPLE PHASE PSK DEMODULATOR

[75] Inventors: Greg A. Nease, Windsor, N.J.; Peter K. Cripps, New Hope, Pa.

[73] Assignee: Agilis Corporation, Mountain View, Calif.

[21] Appl. No.: 320,295

[22] Filed: Mar. 7, 1989

[51] Int. Cl.[5] ............................................. H04L 27/22
[52] U.S. Cl. ..................................... 375/84; 329/304; 375/1; 375/102
[58] Field of Search ....................... 375/1, 115, 40, 83, 375/84, 80, 85, 86, 100, 102; 455/133, 134, 140, 277; 329/110, 112; 370/107

[56] References Cited
U.S. PATENT DOCUMENTS

| | | | |
|---|---|---|---|
| 3,268,816 | 8/1966 | Featherston | 455/133 |
| 4,035,729 | 7/1977 | Perry | 455/135 |
| 4,392,231 | 7/1983 | Henry | 370/80 |
| 4,601,047 | 7/1986 | Horwitz et al. | 375/115 |
| 4,663,768 | 5/1987 | Ryu | 455/133 |
| 4,714,892 | 12/1987 | Ishizuka | 375/84 |
| 4,715,047 | 12/1987 | Hambley | 375/84 |
| 4,715,048 | 12/1987 | Masamura | 375/100 |
| 4,751,478 | 6/1988 | Yoshida | 332/9 R |
| 4,760,344 | 7/1988 | Takase | 329/50 |
| 4,837,786 | 6/1989 | Gurantz et al. | 375/102 |

Primary Examiner—Benedict V. Safourek
Assistant Examiner—Stephen Chin
Attorney, Agent, or Firm—Skjerven, Morrill, MacPherson, Franklin & Friel

[57] ABSTRACT

A multiple phase PSK demodulator for use in a spread spectrum communication system includes a plurality of baseband frequency converters coupled to a corresponding plurality of differential decoders in order to directly recover the encoded PSK data. The logic outputs of the plurality of differential data decoders are coupled to a majority vote logic circuit for determining the correct logic level output signal of the plurality of differential data decoders. In another embodiment, a three phase resistive network is used to convert the two phase quadrature output of two baseband frequency converters to plural phase outputs coupled to the inputs of a corresponding plurality of differential data decoders.

14 Claims, 7 Drawing Sheets

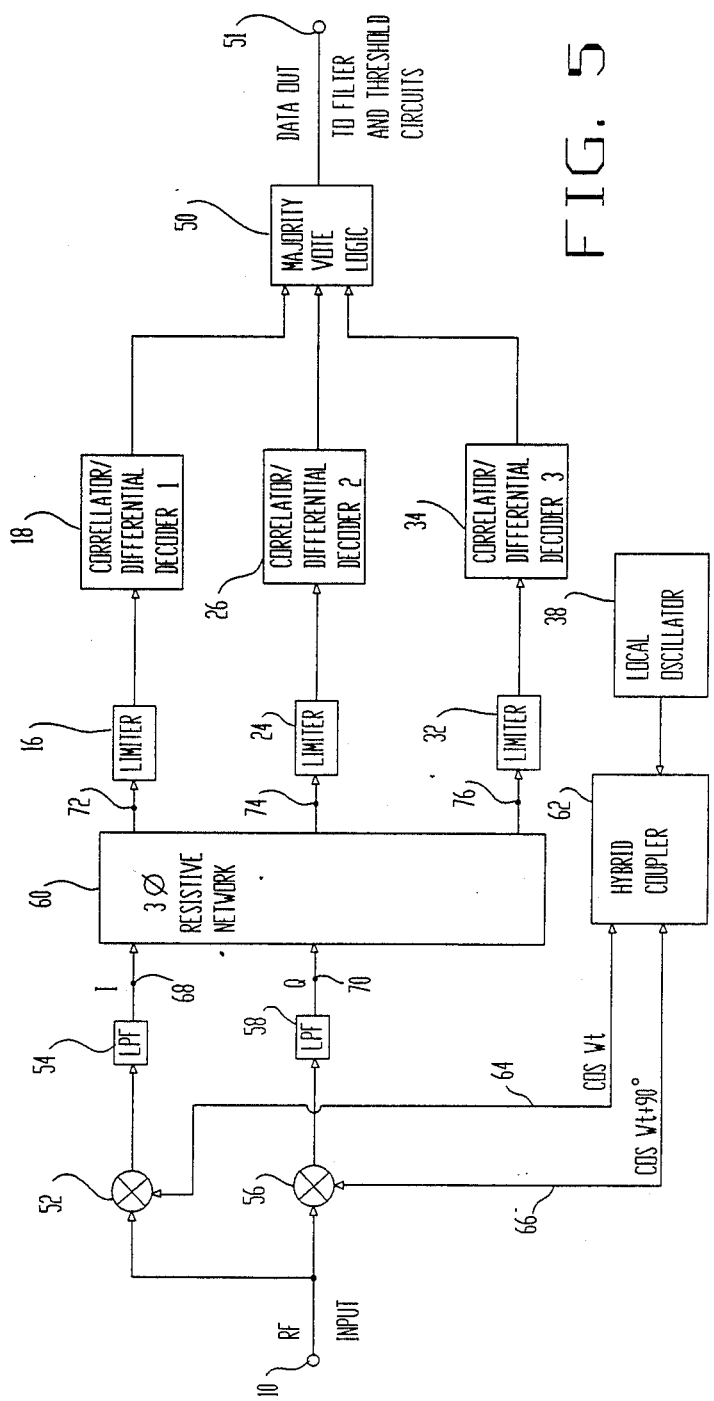

MULTIPLE PHASE PSK DEMODULATOR

FIELD OF THE INVENTION

This invention relates to demodulators for use in phase shift keyed (PSK) systems, and particularly, this invention relates to demodulators for use in binary PSK systems.

BACKGROUND OF THE INVENTION

In a binary PSK system, a binary signal representing data to be transmitted modulates the phase of the transmitter carrier. That is, for a first logic level, the transmitter output is a first phase, typically 0 degrees, while for a second logic level, the transmitter output is a second phase, typically 180 degrees. At the receiver, the phase of the received carrier is sensed in order to recover the data.

In prior art PSK receivers, a local reference oscillator is phase locked to the received RF signal in a phase locked loop in order to establish a local phase reference. However, the time delay required to adjust the phase and frequency of a reference oscillator in a phase locked loop can be substantial and may extend over many data bits. In certain types of communications systems, such as for example in spread spectrum communication systems, the phase synchronization time delay can be excessive, adding to the overhead needed for the operation of a data packet protocol, and in some cases, making existing protocols very difficult to implement.

Therefore, it is desirable to obtain a PSK demodulator which offers the advantage of rapidly synchronizing with the incoming signal in order to recover the originally encoded data without excessive delay.

SUMMARY OF THE INVENTION

The present invention is embodied in a PSK demodulator using a plurality of baseband frequency converters and a corresponding plurality of differential data decoders in order to directly recover the original transmitted data. Specifically, each of said baseband frequency converters comprises a local oscillator operating at a frequency substantially equal to the RF signal frequency which is heterodyned with the incoming signal in a mixer. The baseband output of the mixer is then differentially decoded to recover the original transmitted data signal.

However, due to the inevitable small frequency error between the local oscillator frequency and the incoming RF signal frequency, the recovered baseband signal will be modulated with a beat frequency equal to such small frequency error. The resulting sinewave modulated baseband signal produces data decoding errors around the zero crossings (average DC level) of the baseband signal.

Some data decoding errors may occur due to the low signal to noise ratio around the zero crossings. Moreover, since the phase of the received baseband signal reverses at the zero crossings, differential data decoding errors are thereby caused. That is, due to the phase reversal of the received baseband signal which immediately follows the zero crossings, the differential decoder will produce an erroneous output.

In the present invention, in order to overcome the errors around the zero crossings, at least a second baseband frequency converter is included which uses a different phase local oscillator signal as compared to the phase of the local oscillator signal used in the first baseband frequency converter. Although the second phase baseband frequency converter will also have data decoding errors surrounding the zero crossings of the output signal therefrom, the data decoding errors of the first and second baseband frequency converters will not occur at the same time.

In one embodiment of the present invention, the output signal strengths of the first and second phase baseband frequency converters are compared, and, based on such comparison, the output of the differential data decoder following the baseband frequency converter having the greater output signal strength is selected. Thus, the data decoding errors caused at the region of the zero crossings of received baseband signals are avoided.

In a second embodiment of the present invention, yet a third phase baseband frequency converter is included which uses yet a different phase local oscillator than that of either the first or second baseband frequency converters. However, since only one of the three baseband frequency converters will have a zero crossing at any one time, then it follows that two out of the three phase baseband frequency converters will have correct data output. In the present invention, the output of the PSK demodulator is coupled to a majority vote logic circuit responsive to the outputs of the differential data decoders. Thus, the differential data decoding errors are eliminated by majority vote without the need for signal strength comparisons of any of the received baseband signals.

In yet another alternative embodiment of the present invention, three different phase baseband signals are derived from two different phase baseband signals by vector addition and substraction. Specifically, the output of two quadrature phase baseband frequency converters are linearly combined in a resistive network to produce three phase baseband signals for input to respective three following differential data decoders. As before, a majority vote logic circuit is responsive to the outputs of the three differential data decoders in order to eliminate the incorrect differential data decoder output.

DESCRIPTION OF THE FIGURES

FIG. 5 is a block diagram of a multiple phase PSK demodulator embodying the present invention.

DETAILED DESCRIPTION

Figure 1:
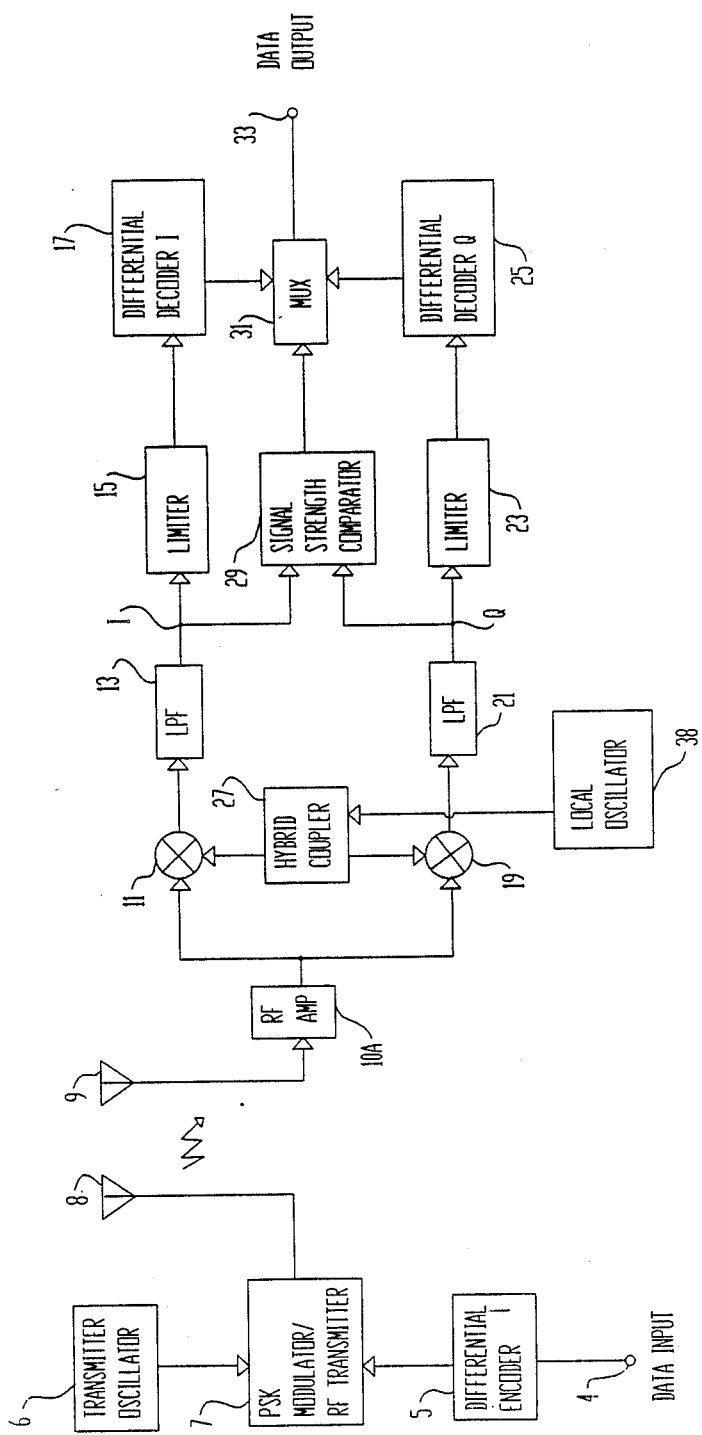
FIG. 1 is a block diagram of a data communication system including a multiple phase PSK demodulator in accordance with the present invention.

In the data communication system of FIG. 1, data input at terminal 4 is transmitted through the system and received at data output terminal 33. At the transmitter, data input at terminal 4 is encoded in differential encoder 5 and coupled to PSK modulator/RF transmiter 7, the frequency of which is determined by the frequency of the transmitter oscillator 6. The phase modulated, differentially encoded signal is transmitted by antenna 8 through a suitable transmission medium, received by receiver antenna 9 and amplified in RF amplifier 10A.

The PSK demodulator of the present invention includes a first baseband frequency converter comprising mixer 11 and low pass filter 13. A second baseband frequency converter comprising mixer 19 and low pass filter 21 is provided. The local oscillator input signals for mixers 11 and 19 are provided from a 90 degree quadrature hybrid coupler 27, which is coupled to local oscillator frequency source 38. The 90 degree quadrature outputs of hybrid coupler 27, i.e. sine and cosine of the local oscillator 38 signal, results in a 90 degree phase shift relationship between certain frequency components in the respective output signals of the first and second baseband frequency converters. Thus, the signals at nodes I and Q at the outputs of low pass filters 13 and 21 respectively, will certain frequency components 90 degrees apart.

Following the first and second baseband frequency converters, is limiter 15, differential decoder 17, limiter 23, and differential decoder 25. A signal strength comparator 29 compares the strength of the signal I with the signal Q, and provides an output signal indication as to which input is greater. A multiplexer 31, having a control terminal connected to the output of signal strength comparator 29, is provided for selectively connecting one of the outputs of differential decoder 17 or differential decoder 25 to data output terminal 33.

In operation, the RF signal applied to mixers 11 and 19 is converted to first and second phase baseband signals at nodes I and Q, which are compared in signal strength comparator 29. The output of signal strength comparator 29 causes multiplexer 31 to select the output of the differential decoder 17 or 25 that is coupled to the stronger of the two signals I and Q for connection to output terminal 33.

Figure 2:
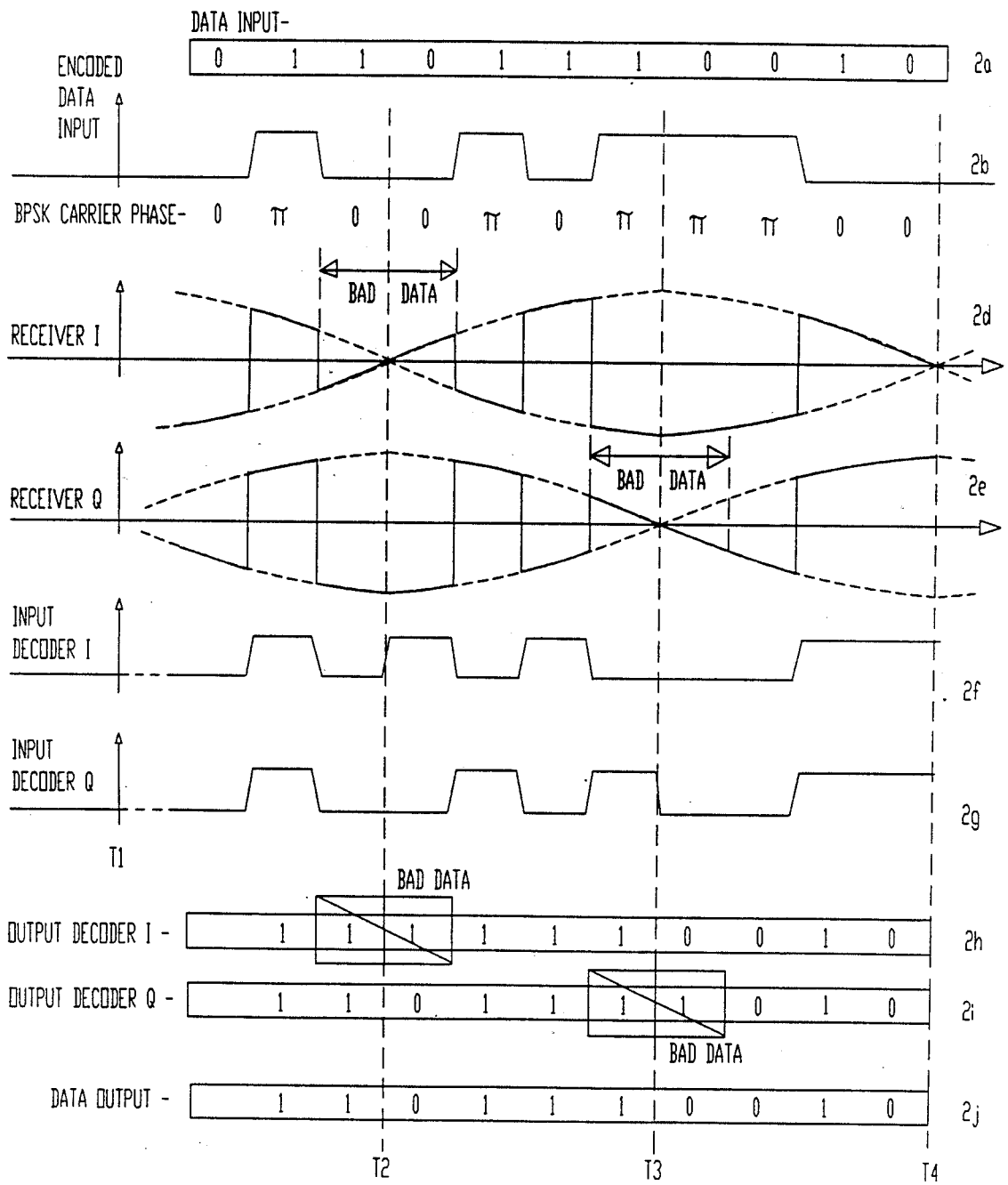
FIGS. 2a–2j are graphical representation of the waveforms and digital data signals illustrating the operation of the system of FIG. 1.

The waveforms of FIG. 2 illustrate the operation of the system of FIG. 1. The data input is shown as a sequence of ones and zeros in FIG. 2a. After differential encoding, the encoded data is shown in FIG. 2b. Briefly, in differential data encoding, a logic 0 is transmitted if there is no change in the present data bit from the previous data bit, while a logic 1 is transmitted if there is a change in the present data bit from the previous data bit. The differentially encoded signal in FIG. 2b modulates the phase of the RF carrier as shown in FIG. 2c, either or zero or 180 degrees.

In a differential decoder, the presently received data bit is compared to the previously received data bit. If the presently received data bit and the previously received data bit are equal, then received data is a logic 0. At the receiver, if the presently received data bit and the previously received data bit are not equal, then the received data is a logic 1. Differential encoders 17 and 25 may be implemented using an exclusive OR gate and a delay element, respectively. A differential decoder which may used in conjunction with the present invention is disclosed in a co-pending patent application Ser. No. 271,614, entitled "DIFFERENTIAL CORRELATOR FOR SPREAD SPECTRUM COMMUNICATION SYSTEM", filed Nov. 15, 1988, and assigned to the same assignee as the present invention. As used in conjunction with the present invention, either the data or the spread spectrum spreading code sequence may be differentially encoded and decoded. At the receiver, the baseband frequency converter output at node I is shown in FIG. 2d; while the baseband frequency converter output at node Q is shown in FIG. 2e. Due to the small frequency error between the frequency of the local oscillator 38 in the receiver and the frequency of the local oscillator 6 in the transmitter, FIGS. 2d and 2e show sinewave modulation superimposed upon the received encoded data signal at the error frequency. Also, due to the 90 degree phase relationship between the local oscillator signals to mixers 11 and 19, the superimposed sinewave modulation in FIGS. 2d and 2e are also 90 degrees apart.

The superimposed error frequency modulation reduces the amplitude of the signal at node I to zero at times T2 and T4, and reduces the amplitude of the signal at node Q to zero at times T1 and T3. Furthermore, in addition to reduced amplitude, the received signal also reverses phase at each zero crossing. The result is that the signal at node I will have bad data around the zero crossings at times T2 and T4, while signal at node Q will have bad data around the zero crossings at times T1 and T3. Bad data results both from a low signal to noise ratio in the vicinity of the zero crossings, and also from the differential data decoding errors due to the undesirable phase reversal immediately following each zero crossing.

However, because the data is differentially encoded and differentially decoded, the system will be self correcting soon after the phase reversal following the zero crossing. That is, because each received bit is compared to a previously received bit, the absolute polarity of the received signal data does not matter, but only the polarity of each data bit relative to the polarity of the previous data bit. Therefore, although an error results from the phase reversal of the received signal immediately following the zero crossing, the use of differential encoding and decoding permits the system to be self correcting on the second data bit following the zero crossing.

The input signals to decoder I and decoder Q following the limiters 15 and 23, are shown in FIGS. 2f and 2g. Limiters 15 and 23 are high gain amplifiers which are used to square up the signals at nodes I and Q to digital levels. As can be seen from the output signals from decoders I and Q in FIGS. 2h and 2i, differential data decoding errors result from the phase reversals at times T2 and T3. However, the data decoding errors do not appear in the output data, FIG. 2j, because multiplexer 31 selects differential decoder I at time T3 and differential decoder Q at time T2. As a result, the data output shown in FIG. 2j does not contain any of the data decoding errors due to the zero crossings discussed above.

Figure 3:
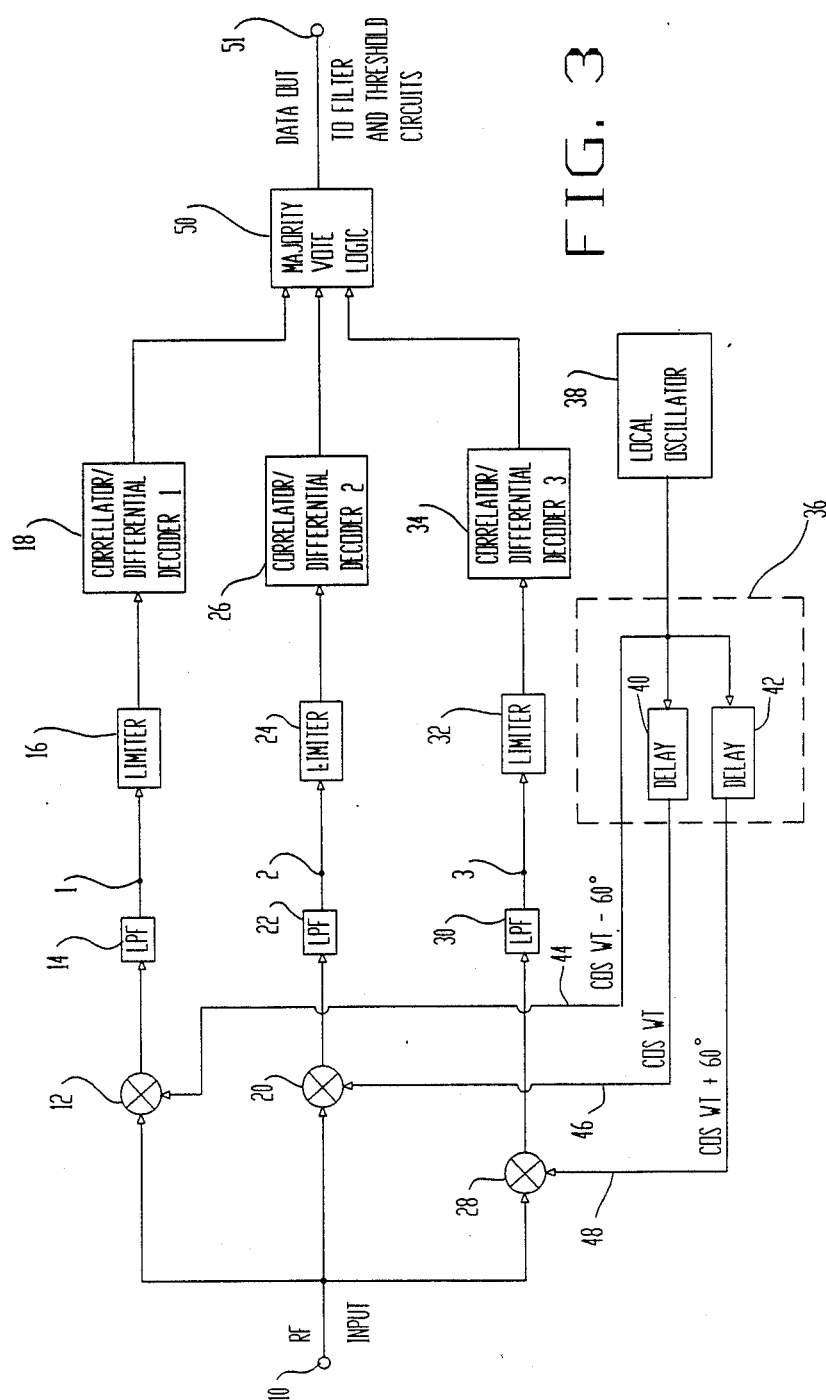
FIG. 3 is a block diagram of a multiple phase PSK demodulator in accordance with the present invention.

A multiple phase PSK demodulator using three baseband frequency converters shown in FIG. 3. This embodiment of the invention is intended for use in a spread spectrum communications system, and either the data or the spread spectrum spreading code sequence may be differentially encoded.

A first baseband frequency converter comprises mixer 12 and low pass filter 14, and is followed by limiter 16 and correlator/differential decoder 18. A second phase baseband frequency converter comprises mixer 20 and low pass filter 22, and is followed by limiter 24 and correlator/differential decoder 26. A third baseband frequency converter comprises mixer 28 and low pass filter 30, and is followed by limiter 32 and correlator/differential decoder 34. Each of the three phase baseband frequency converters receives a different phase local oscillator signal provided by local oscillator 38 and a multiple phase generator circuit 36. In particular, three sinusoidal signals of the same frequency as local oscillator 38, but 60 and 120 degrees delayed respectively, are provided by delay element 40 and delay element 42. Delay element 40 is typically set to provide a 1/6 period delay, and delay element 42 is typically set to provide a ⅓ period delay at the local oscillator frequency. Delays 40 and 42 may be implemented by a length of microstrip transmission line. The input terminals of a majority vote logic circuit 50 are connected the respective output terminals of correlator/differential decoders 18, 26, and 34. The output of majority vote logic circuit 50 is coupled to the data output terminal 51.

In operation, each of the first, second and third baseband frequency converters translates the received RF signal at terminal 10 in the frequency spectrum to baseband at respective nodes 1, 2 and 3 in FIG. 3. Following conversion to baseband, the received signals are amplified in limiters 16, 24, and 32 respectively, and differentially decoded in respective correlator/differential decoders 18, 26, and 34. Majority vote logic gate 50, selects the logic level output corresponding to the majority vote of correlator/differential decoders 18, 26, and 34 for output to data output terminal 51.

Figure 4:
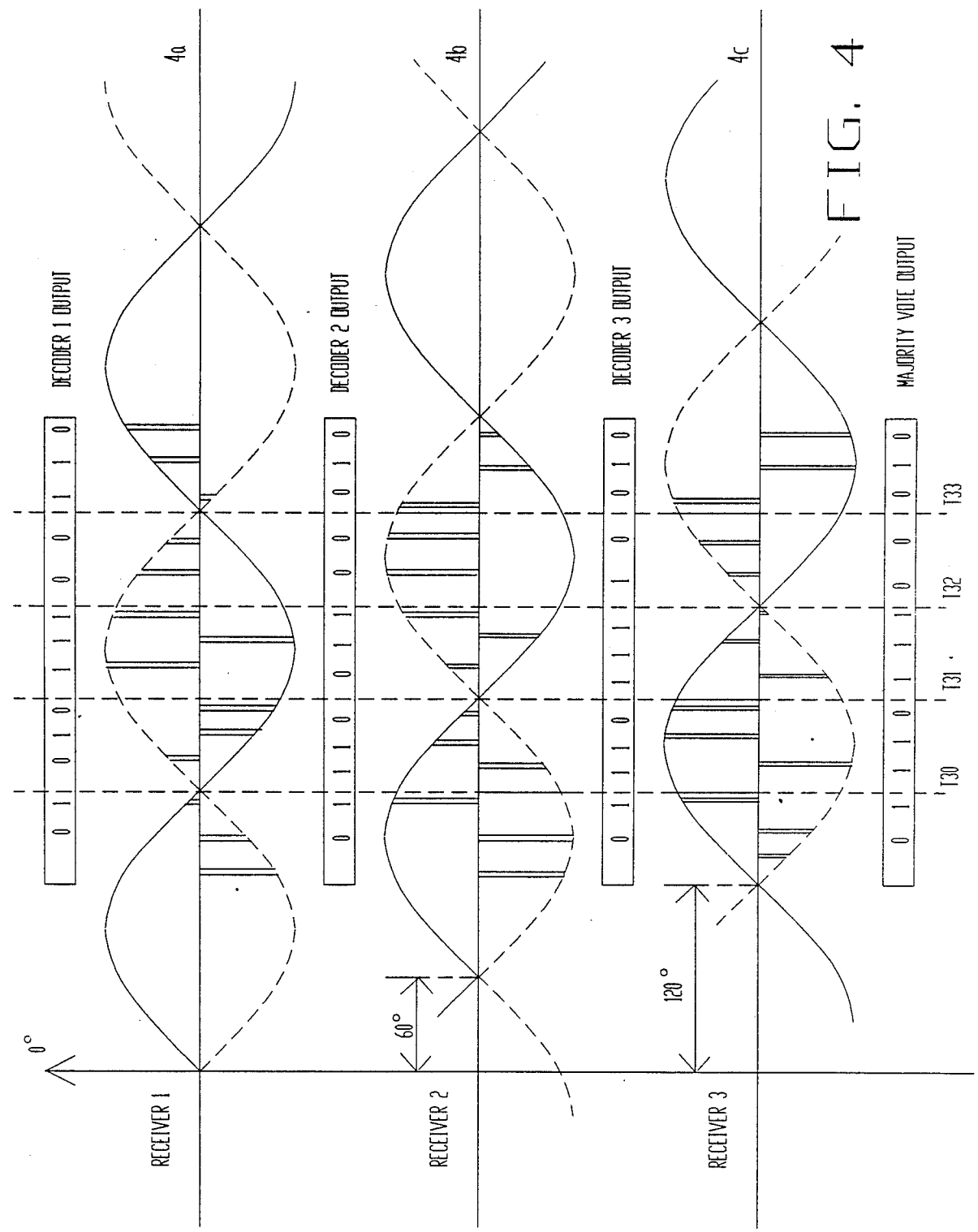
FIG. 4 is a graphical representation of the waveforms and digital data signals illustrating the operation of the PSK demodulator, of FIG. 3.
Figure 6B:
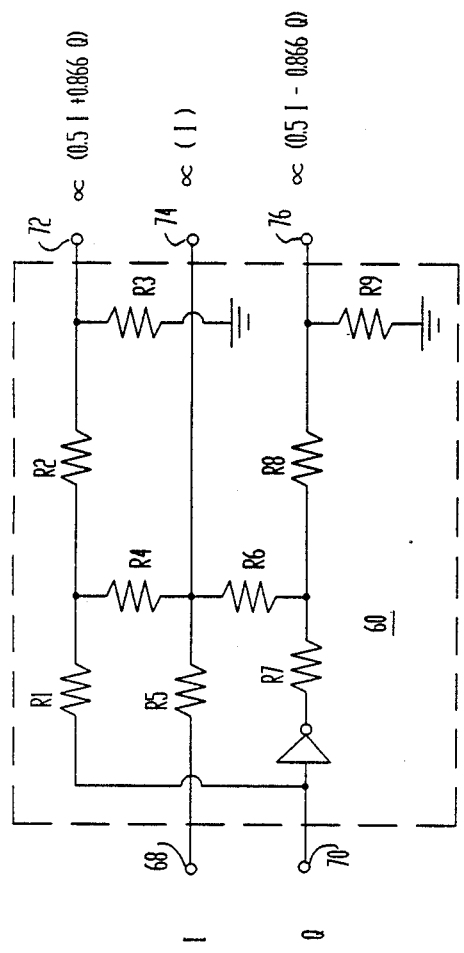
FIGS. 6a–6d are circuit diagram showing alternate embodiments of the three phase resistive network shown in FIG. 5.
Figure 6D:
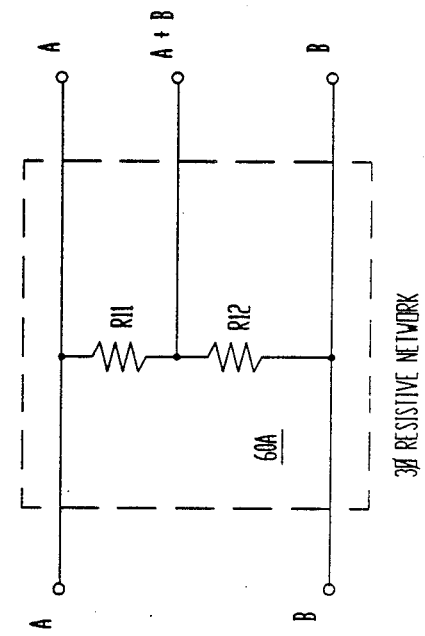
Figure 6A:
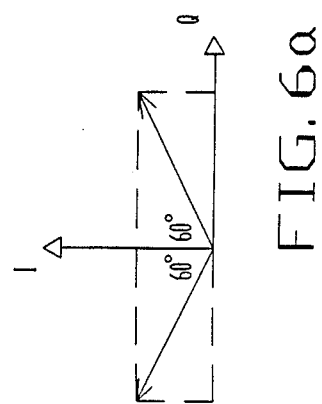
Figure 6C:
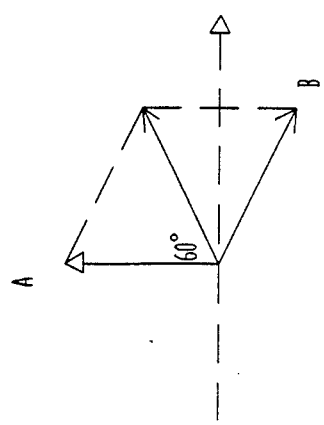

The operation of the PSK demodulator of FIG. 3 may be better understood by consideration of the waveforms in FIG. 4. The received output of the first baseband frequency converter at node 1 is shown in FIG. 4a. Similarly, the received outputs of the second and third baseband frequency converters at nodes 2 and 3 are shown in FIGS. 4a and 4b, respectively. Also, adjacent to the receiver outputs is the differentially decoded logic outputs of the corresponding respective correlator/differential decoders. Again, in differential decoding, a logic 0 is represented by no change, and a logic 1 by a change, between the presently received data bit and the previously received data bit.

The waveforms shown in FIG. 4 may represent either the narrow correlation spikes of a conventional spread spectrum correlator, or may represent the chip by chip differential comparison of a differentially encoded spread spectrum spreading code sequence. In the latter case, only the correlation spikes that are one spreading code sequence apart are shown, and the intervening correlation spikes have been omitted for clarity.

It can be seen from the waveforms of FIGS. 4b and 4c, that the phase of the superimposed sine wave modulation at node 2 leads by 60 degrees, while the phase of the superimposed sine wave modulation at node 3 leads by 120 degrees. Also, for the reasons discussed above, the signal of FIG. 4a will produce data decoding errors surrounding the zero crossings at times T30 and T33. Similarly, the signal of 4b will produce data decoding errors around the zero crossing at time T31, while the signal of FIG. 4c will produce data decoding errors around the zero crossing at time T32. However, at any given time in which one of the waveforms of FIG. 4 has a zero crossing, it is noted that the other two waveforms do not. Therefore, by majority vote of the output of differential decoders 18, 26, and 34, the correct output data is determined as shown in FIG. 4c, which is equal to the assumed data input shown in FIG. 4a.

In accordance with yet another aspect of the present invention, FIG. 5 shows a multiple phase PSK demodulator using only two baseband frequency converters to produce three baseband frequency received signals.

An RF signal received at input terminal 10 is connected to the first baseband frequency converter comprising mixer 52 and low pass filter 54, and also to the second baseband frequency converter comprising mixer 56 and low pass filter 58. Local oscillator 38 provides a local oscillator signal to a 90 degree quadrature hybrid coupler 62, the outputs of which are connected to the respective inputs of mixers 52 and 56. Thus, two baseband signals at nodes I and Q are produced at terminal 68 and 70, similar to that in the PSK demodulator of FIG. 1. That is, due to the mixers 52 and 56 having local oscillator input signals from the quadrature outputs of hybrid coupler 62, i.e. sine and cosine of the local oscillator 38 signal, a 90 degree phase shift relationship between certain frequency components in the respective output signals of the first and second baseband frequency converters will result. Thus, the signals at nodes I and Q at the outputs of low pass filters 54 and 58 respectively, will certain frequency components 90 degrees apart.

In the three phase resistive network 60 the signals at nodes I and Q, which have frequency components 90 degrees apart, are combined to produce three output signals at terminals 72, 74 and 76 respectively, which have frequency components 60 degrees apart. The remainder of the block diagram of FIG. 5, after the resistive network 60, is similar in operation to the corresponding elements in the block diagram of FIG. 3.

A three phase resistive network for converting the signals at nodes I and Q by vector addition and substraction into three different phase baseband signals is shown in FIG. 6. Resistors R1, R2, R3, R4, R5, R6, R7, R8, and R9, are arranged in a passive network for providing the sum and difference of the signals at nodes I and Q as shown by the equations in the figure as output signals on terminals 72, 74 and 76. Thus, the three baseband frequency converters of FIG. 3 are replaced by two baseband frequency converters plus a three phase resistive network, thereby eliminating the third baseband frequency converter.

A simplified alternate embodiment of the three phase resistive network using only two resistors R11 and R12 is also shown in FIG. 6. While the signals I and Q are generated using local oscillator signals 90 degrees apart, the signals A and B are generated using local oscillator signals 120 degrees apart.

Figure 7A:
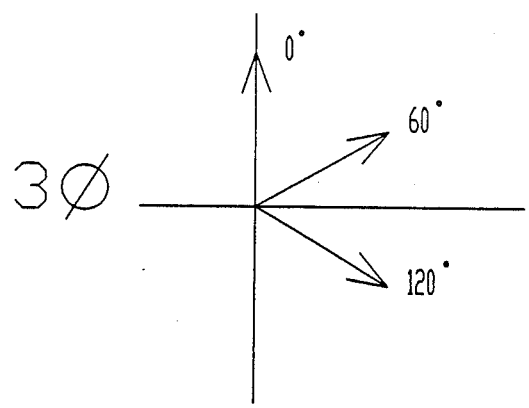
FIG. 7a–7c are vector diagrams illustrating the phase relationships of signals which may be used in various alternate embodiments of the present invention.
Figure 7B:
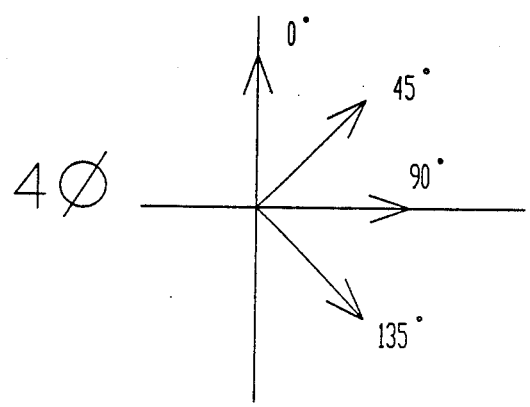
Figure 7C:
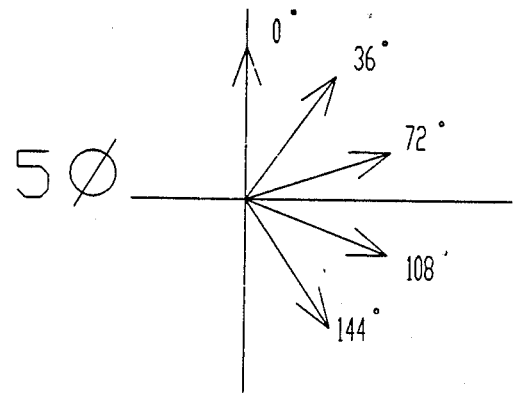

The present invention may also be used in conjunction with any other number of multiple phase local oscillator signals and baseband frequency converters. As shown in FIG. 7a, for example, the three phase local oscillator signals used in the described embodiment of the present invention are illustrated in a vector diagram. It is also possible to use a four phase system as shown in the vector diagram of FIG. 7b. In such case, four different phase local oscillator signals, each 45 degrees apart, are used. In FIG. 7c, five different phase local oscillator signals, each 36 degrees apart, are used. In any case, either the differential data decoder output corresponding to the strongest received baseband frequency signal or the digital value corresponding to teh majority note of all the outputs of the differential data decoders, is the correct output.

What is claimed is:

1. A method for use in a spread spectrum system for demodulating a differentially encoded spread spectrum spreading code sequence phase modulated on a carrier signal frequency, said method comprising:
   converting said phase modulated carrier signal frequency to a first baseband signal using a local oscillator frequency having a first phase;
   differentially decoding said first baseband signal to provide a first differentially decoded spread spectrum spreading code sequence output signal;
   converting said phase modulated carrier signal frequency to a second baseband signal using a local oscillator frequency having a second phase;
   differentially decoding said second baseband signal to provide a second differentially decoded spread spectrum spreading code sequence output signal;
   converting said phase modulated carrier signal frequency to a third baseband signal using a local oscillator frequency having a third phase;
   differentially decoding said third baseband signal to provide a third differentially decoded spread spectrum spreading code sequence output signal; and
   selecting two of said first, second and third differentially decoded spread spectrum spreading code sequence output signals which have substantially the same logic output logic signal level, as the correct differentially decoded spread spectrum spreading code sequence output signal.

2. A method in accordance with claim 1, wherein said step of selecting at least two of said first, second and third differentially decoded spread spectrum spreading code sequence output signals as the correct differentially decoded spread spectrum spreading code sequence output signal comprises:
   taking the majority vote of said first, second and third differentially decoded spread spectrum spreading code sequence output signals and providing said majority vote as the correct differentially decoded spread spectrum spreading code sequence output signal.

3. A method for demodulating differentially encoded data phase modulated on a carrier signal frequency said method comprising:
   converting said phase modulated carrier signal frequency to a first intermediate baseband signal using a local oscillator frequency having a first phase;
   converting said phase modulated carrier signal frequency to a second intermediate baseband signal using a local oscillator frequency having a second phase;
   combining said first and second intermediate baseband signals to produce respective first, second and third baseband signals;
   differentially decoding said first baseband signal to provide a first differentially decoded data output signal;
   differentially decoding said second baseband signal to provide a second differentially decoded data output signal;
   differentially decoding said third baseband signal to provide a third differentially decoded data output signal; and
   selecting two of said first, second and third differentially decoded data output signals which have substantially the same logic output logic signal level, as the correct differentially decoded data output signal.

4. A method in accordance with claim 3 wherein said step of selecting two of said first, second or third differentially decoded data output signals comprises the step of:
   taking the majority vote of said first, second and third differentially decoded data output signals and providing said majority vote as the correct differentially decoded data output signal.

5. An apparatus for use in a spread spectrum system for demodulating a differentially encoded spread spectrum spreading code sequence phase modulated on a carrier signal frequency, said apparatus comprising:
   an input terminal for receiving said phase modulated carrier signal frequency;
   means coupled to said input terminal for converting said phase modulated carrier signal frequency to a first baseband signal using a local oscillator frequency having a first phase;
   means for differentially decoding said first baseband signal to provide a first differentially decoded spread spectrum spreading code sequence output signal;
   means coupled to said input terminal for converting said phase modulated carrier signal frequency to a second baseband signal using a local oscillator frequency having a second phase;
   means for differentially decoding said second baseband signal to provide a second differentially decoded spread spectrum spreading code sequence output signal;
   means for converting said phase modulated carrier signal frequency to a third baseband signal using a local oscillator frequency having a third phase;
   means for differentially decoding said third baseband signal to provide a third differentially decoded spread spectrum spreading code sequence output signal and;
   means coupled to said differential decoding means for selecting two of said first, second and third differentially decoded spread spectrum spreading code sequence output signals which have substantially the same logic output logic signal level, as the correct differentially decoded spread spectrum spreading code sequence output signal.

6. An apparatus in accordance with claim 5, wherein said means for selecting two of said first, second and third differentially decoded spread spectrum spreading code sequence output signals which have substantially the same logic output logic signal level as the correct differentially decoded spread spectrum spreading code sequence output signal comprises:
   an output terminal; and
   majority vote logic means for receiving said first, second and third differentially decoded spread spectrum spreading code sequence output signals and for providing the majority vote of said first, second and third differentially decoded spread spectrum spreading code sequence output signals as the correct differentially decoded spread spectrum spreading code sequence output signal at said output terminal.

7. An apparatus for demodulating differentially encoded data phase modulated on a carrier signal frequency said apparatus comprising:
   an input terminal for receiving said carrier signal frequency;
   means coupled to said input terminal for converting said phase modulated carrier signal frequency to a first intermediate baseband signal using a local oscillator frequency having a first phase;

means coupled to said input terminal for converting said phase modulated carrier signal frequency to a second intermediate baseband signal using a local oscillator frequency having a second phase;

means for combining said first and second intermediate baseband signals to produce respective first, second and third baseband signals;

means for differentially decoding said first baseband signal to provide a first differentially decoded data output signal;

means for differentially decoding said second baseband signal to provide a second differentially decoded data output signal;

means for differentially decoding said third baseband signal to provide a third differentially decoded data output signal; and means coupled to said respective differential decoding means for selecting two of said first, second and third differentially decoded data output signals which have substantially the same logic output logic signal level, as the correct differentially decoded data output signal.

8. An apparatus in accordance with claim 7, wherein said means for selecting two of said first, second and third differentially decoded data output signals which have substantially the same logic output logic signal level as the correct differentially decoded data output signal comprises:

an output terminal; and majority vote logic means for receiving said first, second and third differentially decoded data output signals and for providing the majority vote of said first, second and third differentially decoded data output signals as the correct differentially decoded data output signal at said output terminal.

9. A multiple phase PSK demodulator for demodulating differentially encoded data phase modulated on a carrier signal frequency, said demodulator comprising:

an input terminal;

an output terminal;

a plurality of baseband frequency converters each having respective input terminals connected to said input terminal, respective output terminals, and respective local oscillator input terminals;

local oscillator means for generating a plurality of multiple phase local oscillator signals, each of said multiple phase local oscillator signals being coupled to a respective one of said plurality of local oscillator input terminals of said plurality of baseband frequency converters, respectively;

a plurality of differential data decoders each having respective input and output terminals;

a plurality of means for coupling the respective output terminals of said plurality of said baseband frequency converters to the respective input terminals of said plurality of differential data decoders;

amplitude comparator means for comparing the output signal amplitudes of said plurality of baseband frequency converters, said amplitude comparator means having an output signal indication representing the baseband frequency converter having the greatest output signal strength; and multiplexer means having a control terminal coupled to, and responsive to, said output signal indication of said amplitude comparator means for selectively connecting one of said outputs of said plurality of differential data decoders to said output terminal.

10. A multiple phase PSK demodulator in accordance with claim 9, wherein said plurality of means for coupling the respective outputs of said plurality of baseband frequency converters to the respective inputs of said plurality of differential data decoders, each comprises a limiter circuit.

11. A multiple phase PSK demodulator for use in a spread spectrum system for demodulating a differentially encoded spread spectrum spreading code sequence phase modulated on a carrier signal frequency, said demodulator comprising:

an input terminal;

an output terminal;

a plurality of baseband frequency converters, each having respective input terminals connected to said input terminal, respective output terminals, and respective local oscillator input terminals;

local oscillator means for generating a plurality of multiple phase local oscillator signals, each of said multiple phase local oscillator signals being coupled to a respective one of said plurality of local oscillator input terminals of said plurality of baseband frequency converters, respectively;

a plurality of differential spread spectrum spreading code sequence decoder means each having respective input and output terminals;

a plurality of coupling means for coupling the respective output terminals of said plurality of baseband frequency converters to the respective input terminals of said plurality of differential spread spectrum spreading code sequence decoders and;

majority vote logic means having a plurality of input terminals coupled to respective output terminals of said plurality of differential spread spectrum spreading code sequence decoder means, for providing at said output terminal a majority vote of the of the differential spread spectrum spreading code sequence decoder means output of said plurality of differential spread spectrum spreading code sequence decoders.

12. A multiple phase PSK demodulator in accordance with claim 11, wherein each of said plurality of coupling means for coupling the respective output terminals of said plurality of baseband frequency converters to the respective input terminals of said plurality of differential data decoders comprises a limiter circuit.

13. A multiple phase PSK demodulator for demodulating differentially encoded data phase modulated on a carrier signal frequency, said demodulator comprising:

an input terminal;

an output terminal;

first and second baseband frequency converters each having respective input terminals connected to said input terminal, respective output terminals and respective local oscillator input terminals;

local oscillator mans for generating first and second phase local oscillator signals coupled to said first and second local oscillator input terminals of said first and second baseband frequency converters, respectively, said output signals of said first and second baseband frequency converters representing two different phase output signals therefrom;

a phase converter means coupled to the output terminals of said first and second baseband frequency converters, for generating a plurality of multiple phase baseband signals, said phase converter means including means for combining said two different phase output signals of said first and second baseband frequency converters to produce at least three different phase output signals at said baseband signal frequency;

a plurality of differential data decoder means each having respective input and output terminals;

a plurality of coupling means for coupling the respective output terminals of said phase converter means to the respective input terminals of said plurality of differential data decoders and;

majority vote logic means having a plurality of input terminals coupled to respective output terminals of said plurality of differential data decoder means, for providing at said output terminal a majority vote of the of the differential data decoder means output of said plurality of differential data decoders.

14. A multiple phase PSK demodulator in accordance with claim 13, wherein each of said plurality of coupling means for coupling the respective output terminals of said phase converter means to the respective input terminals of said plurality of differential data decoders comprises a limiter circuit.

* * * * *